United States Patent
Spenik et al.

(10) Patent No.: US 7,616,959 B2
(45) Date of Patent: Nov. 10, 2009

(54) METHOD AND APPARATUS FOR SHAPED ANTENNA RADIATION PATTERNS

(75) Inventors: John Spenik, Phoenix, AZ (US); Brian Woodbury, Gilbert, AZ (US); Roc Lastinger, Cave Creek, AZ (US); Nicholas Funke, Scottsdale, AZ (US)

(73) Assignee: Rotani, Inc., Scottsdale, AZ (US)

( * ) Notice: Subject to any disclaimer, the term of this patent is extended or adjusted under 35 U.S.C. 154(b) by 167 days.

(21) Appl. No.: 12/021,278

(22) Filed: Jan. 28, 2008

(65) Prior Publication Data

US 2008/0150827 A1 Jun. 26, 2008

Related U.S. Application Data

(62) Division of application No. 11/160,937, filed on Jul. 15, 2005, now Pat. No. 7,349,701.

(60) Provisional application No. 60/589,088, filed on Jul. 19, 2004.

(51) Int. Cl.
*H04Q 7/20* (2006.01)
*H04B 1/00* (2006.01)

(52) U.S. Cl. ............ 455/446; 455/63.4; 455/562.1

(58) Field of Classification Search ............ 455/25, 455/63.4, 446, 447, 562.1; 343/767, 770
See application file for complete search history.

(56) References Cited

U.S. PATENT DOCUMENTS

| | | | |
|---|---|---|---|
| 4,144,496 A | 3/1979 | Cunningham et al. |
| 5,161,249 A | 11/1992 | Meche et al. |
| 5,212,930 A | 5/1993 | Raudat et al. |
| 5,606,727 A | 2/1997 | Ueda |
| 5,771,449 A | 6/1998 | Blasing |
| 6,095,820 A | 8/2000 | Luxon et al. |
| 6,104,935 A | 8/2000 | Smith et al. |
| 6,229,486 B1 | 5/2001 | Krile |
| 6,246,674 B1 | 6/2001 | Feuerstein et al. |
| 6,249,256 B1 | 6/2001 | Luxon et al. |
| 6,272,337 B1 | 8/2001 | Mount et al. |
| 6,278,723 B1 | 8/2001 | Meihofer |
| 6,304,762 B1 | 10/2001 | Myers et al. |
| 6,400,955 B1 | 6/2002 | Kawabata |
| 6,405,058 B2 | 6/2002 | Bobier |
| 6,421,542 B1 | 7/2002 | Sandler et al. |
| 6,463,301 B1 | 10/2002 | Bevan |
| 6,470,195 B1 | 10/2002 | Meyer |
| 6,486,832 B1 | 11/2002 | Abramov |
| 6,505,045 B1 | 1/2003 | Hills |
| 6,531,985 B1 | 3/2003 | Jones |

(Continued)

FOREIGN PATENT DOCUMENTS

WO WO03/023895 5/2003

(Continued)

*Primary Examiner*—Lee Nguyen
(74) *Attorney, Agent, or Firm*—Letham Law Firm LLC; Lawrence Letham (57) ABSTRACT

Methods and apparatus for antennas, wireless cells and networks are described. Antennas may use a shield to provide a shape of coverage, area of coverage, and channel assignment pattern configured for high throughput wireless cells and networks. Antenna combining devices may be used to form wireless cells configured for high throughput wireless cells and networks.

19 Claims, 7 Drawing Sheets

U.S. PATENT DOCUMENTS

| | | | |
|---|---|---|---|
| 6,542,736 | B1 | 4/2003 | Parkvall et al. |
| 6,560,443 | B1 | 5/2003 | Vaisanen |
| 6,690,657 | B1 | 2/2004 | Lau |
| 6,693,510 | B1 | 2/2004 | Yamaguchi |
| 6,906,674 | B2 | 6/2005 | McKinzie, III et al. |
| 7,171,248 | B1 | 1/2007 | Brown |
| 7,349,701 | B2 * | 3/2008 | Lastinger et al. ............ 455/446 |
| 2001/0046866 | A1 | 11/2001 | Wang |
| 2001/0053677 | A1 | 12/2001 | Schiffer |
| 2002/0019233 | A1 | 2/2002 | Leung |
| 2002/0077152 | A1 | 6/2002 | Johnson et al. |
| 2002/0159405 | A1 | 10/2002 | Garrison et al. |
| 2002/0197984 | A1 | 12/2002 | Monin et al. |
| 2003/0002442 | A1 | 1/2003 | Flammer |
| 2003/0087645 | A1 | 5/2003 | Kim |
| 2003/0109285 | A1 | 6/2003 | Reed |
| 2003/0125089 | A1 | 7/2003 | Pedersen |
| 2003/0181180 | A1 | 9/2003 | Darabi |
| 2003/0210665 | A1 | 11/2003 | Salmenkaita et al. |
| 2004/0009791 | A1 | 1/2004 | Hiramatsu |
| 2004/0106412 | A1 | 6/2004 | Laroia et al. |
| 2004/0196834 | A1 | 10/2004 | Ofek |
| 2005/0037766 | A1 | 2/2005 | Hans et al. |
| 2005/0070294 | A1 | 3/2005 | Lyle et al. |
| 2008/0024382 | A1 | 1/2008 | Uddin et al. |

FOREIGN PATENT DOCUMENTS

WO    WO2005/039225    4/2005

* cited by examiner

METHOD AND APPARATUS FOR SHAPED ANTENNA RADIATION PATTERNS

CROSS-REFERENCE TO RELATED APPLICATIONS

Pursuant to 35 U.S.C. §§120-121 this application is a divisional of and claims the benefit of U.S. application Ser. No. 11/160,937 filed Jul. 15, 2005 now U.S. Pat. No. 7,349,701, which claims the benefit under 35 U.S.C. §§119(e) to U.S. provisional application No. 60/589,088 filed Jul. 19, 2004 herein incorporated by reference.

BACKGROUND OF THE INVENTION

1. Field of the Invention

This invention generally relates to wireless communications, and more particularly, to systems and methods for wireless cells, and wireless networks.

2. Description of Related Art

Many systems incorporate the IEEE 802.11 protocols, channels, and encoding to create wireless access points and clients capable of communicating with each other regardless of the manufacturer of the device. As such, the popularity of wireless access and connectivity has increased demand for wireless throughput. However, most of the current generation of radios do not enable a developer to control the diversity switch found on most radios and many of the diversity switches to not operate in a manner that may allow radios to provide higher throughput sectorized coverage.

BRIEF SUMMARY OF THE INVENTION

The invention overcomes the limitations and problems of the prior art by providing methods and apparatus for using radios without diversity switches to provide directional coverage in one or more directions. In one embodiment, a shield shapes the coverage area of an omni-directional antenna into coverage lobes similar to physical sector of a directional antenna. In another embodiment, omni-directional antennas with shields are assigned minimally interfering radio channels and are stacked to provide overlapping or non-overlapping coverage similar to a sectorized wireless cell.

In another embodiment, a radio uses an antenna combining device to communicate through at least two antennas. The antennas may be arranged in an overlapping or non-overlapping arrangement to provide wireless coverage.

BRIEF DESCRIPTION OF THE SEVERAL VIEWS OF THE DRAWING(S)

A more complete understanding of the present invention may be derived by referring to the detailed description and claims when considered in connection with the Figures, wherein like reference numbers refer to similar elements throughout the Figures, and:

DETAILED DESCRIPTION OF EXEMPLARY EMBODIMENTS

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

For the sake of brevity, conventional aspects may not be described in detail herein. Furthermore, the component positions shown in the various figures contained herein are intended to represent exemplary functional relationships and/or physical couplings between the various elements. It should be noted that many alternative or additional functional relationships or physical connections may be present in a practical system.

As will be appreciated by one of ordinary skill in the art, the present invention may be embodied as a customization of an existing system, an add-on product, a stand alone system, and/or a distributed system. Accordingly, the present invention may take the form of an entirely hardware embodiment, or an embodiment combining aspects of both software and hardware.

This application hereby incorporates by reference U.S. utility application Ser. No. 10/869,201 filed on Jun. 15, 2004, and U.S. utility application Ser. No. 10/880,387 filed on Jun. 29, 2004. Both applications are incorporated for the teachings taught therein.

Figure 8:
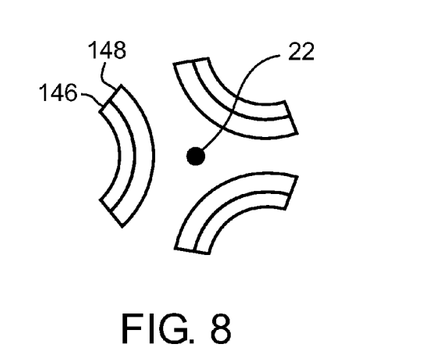
FIG. 8 is a diagram of a cross-sectional view of an exemplary shield configured using two materials.

The shape of the area of coverage of an omni-directional antenna is ideally a sphere. In two dimensions, the ideal shape of the area of coverage of an omni-directional antenna may be represented as a circle. A shield may be used to modify the shape of coverage of an antenna. A shield may selectively block or allow radiation from an antenna. Areas where antenna radiation is blocked may form a null where there may be reduced radio coverage and/or signal strength. Areas where antenna radiation is allowed may form coverage lobes. The openings that allow radiation may be of any shape, such as, for example, rectangular, circular, square, and polygon. Shields may have a top and/or a bottom. In one embodiment, the shield is connected to a bottom, and rises to a desired height, but does not have a top. In another embodiment, the bottom acts as a ground plane. Shields may be made of any material or any combination of materials. The material may be at least one of absorptive, reflective, or conductive of radio waves in a desired range. In one embodiment, referring to FIG. 8, a shield may use a reflective material 146 and an absorptive material 148. In another embodiment, the absorptive material is urethane foam configured to attenuate radio signals in the frequency range of interest. A shield may be of any shape or size. The portions of a shield that block or allow radiation may be fixed or adjustable. A shield may provide any angle of coverage. The antenna used with a shield may be of any type, such as, for example, omni-directional, patch, omni-directional with reflector, omni-directional positioned in a horn, yagi, MIMO, array, adaptive array, dish, beam, and parabolic antennas. Antennas used with a shield may provide any angle of coverage, such as, for example, omni-directional or directional. More than one type of antenna may be placed in a shield, for example, two directional antennas may be placed in a shield.

Figure 1:
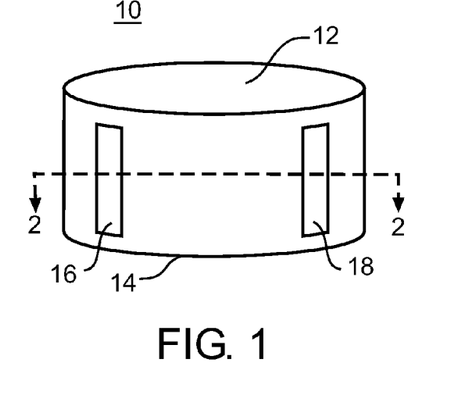
FIG. 1 is a diagram of a side view of an exemplary shield with a 360-degree angle of coverage.
Figure 2:
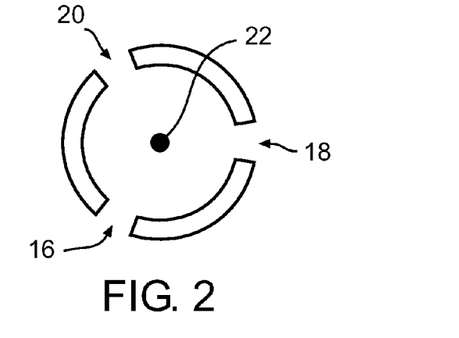
FIG. 2 is a diagram of a cross-sectional view of the exemplary shield of FIG. 1 taken along the line 2-2.
Figure 3:
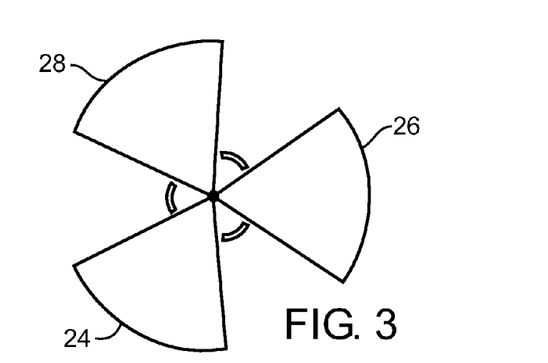
FIG. 3 is a diagram of exemplary coverage pattern produced by an omni-directional antenna inside the exemplary shield of FIG. 2.
Figure 4:
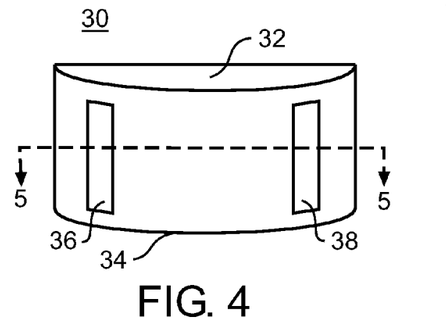
FIG. 4 is a diagram of a side view of an exemplary shield with a 180-degree angle of coverage.
Figure 5:
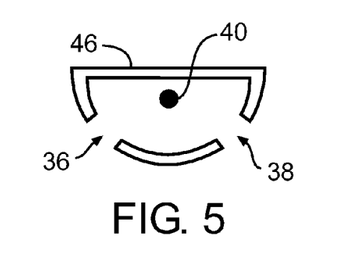
FIG. 5 is a diagram of a cross-sectional view of the exemplary shield of FIG. 4 taken along the line 5-5.
Figure 6:
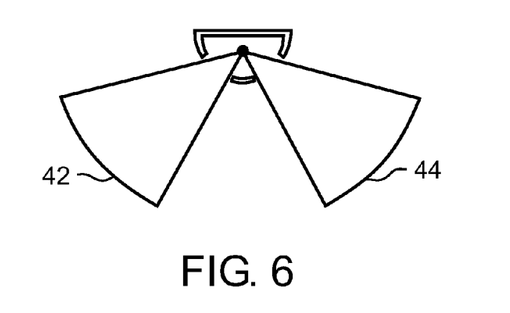
FIG. 6 is a diagram of exemplary coverage pattern produced by an omni-directional antenna inside the exemplary shield of FIG. 5.

A shield may be of any shape or size. In one embodiment, referring to FIGS. 1-3, a shield 10 may be cylindrical in shape with a top 12 and a bottom 14. Omni-directional antenna 22 may radiate through openings 16, 18 and 20 forming coverage lobes 24, 26, and 28 respectively. The shield 10 may be referred to as having a 360-degree angle of coverage because a coverage lobe may be formed in any direction of a 360-degree area. In another embodiment, referring to FIG. 4, FIG. 5, and FIG. 6, a shield 30 may be half of a cylinder in shape with a top 32 and a bottom 34. Omni-directional antenna 40 may radiate through openings 36 and 38 forming coverage lobes 42 and 44 respectively. The shield 30 may be referred to as having a 180-degree angle of coverage because a coverage lobe may be formed anywhere along the 180-degree arc where openings 36 and 38 are located. In another embodiment, at least one opening may be formed in the straight part 46 of shield 30 to allow radiation in additional directions; thereby providing a 360-degree angle of coverage. In another embodiment, a shield may have a half-cylinder shape as shown in FIG. 5, but the openings are formed only in the straight part 46 and not in the curved part. In another embodiment, four openings are formed in shield 10. In another embodiment, openings are not equally spaced from each other. In another embodiment, openings are equally spaced along the shield. In another embodiment, the width of an opening is related to the wave length of the signal used by the antenna. In another embodiment, the spacing of the openings is related to the wavelength of the signal used by the antenna. In another embodiment, the width of an opening may be any size necessary to provide a desired coverage pattern.

Figure 7:
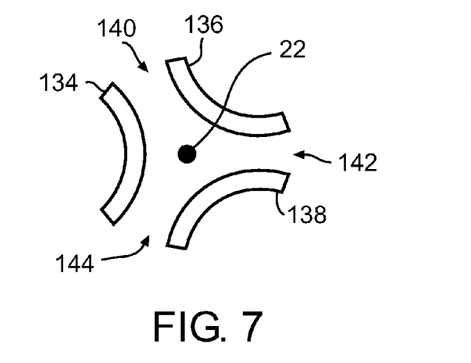
FIG. 7 is a diagram of a cross-sectional view of an exemplary shield.

In another embodiment, referring to FIG. 7, the shield is not cylindrical in shape and reflective or absorptive materials may placed around the antenna to shape the wave form. Shield parts 134, 136, and 138 may form a shield when placed around antenna 22. The antenna may have lobes of radiation through openings 140, 142 and 144. The shield parts may be of any shape or size. The shield parts may be combined with a top and/or a bottom. In another embodiment, the shield parts may be straight.

Figure 9:
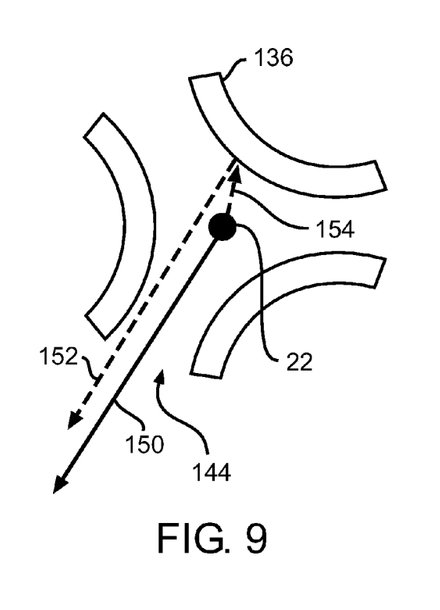
FIG. 9 is a diagram of a cross-sectional view of an exemplary shield transmitting a signal and a reflected signal.
Figure 10:
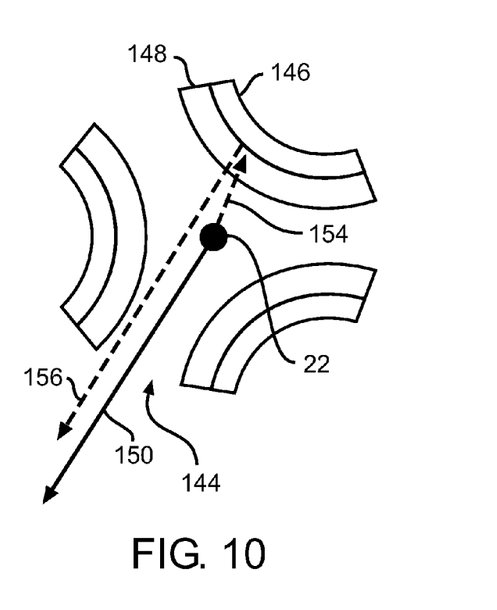
FIG. 10 is a diagram of a cross-sectional view of an exemplary shield transmitting a signal and a reflected signal through an absorptive material.
Figure 11:
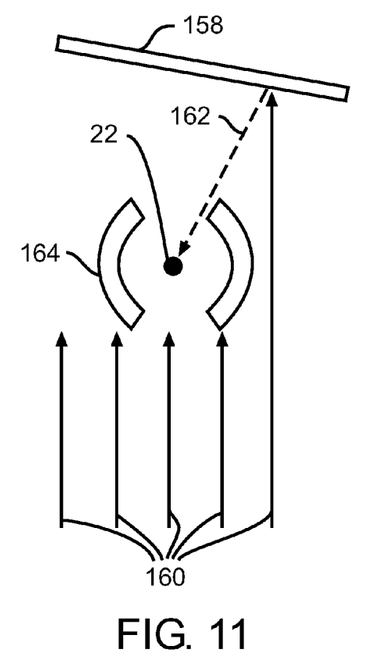
FIG. 11 is a diagram of a cross-sectional view of an exemplary shield receiving a signal directly and receiving a reflected signal.
Figure 12:
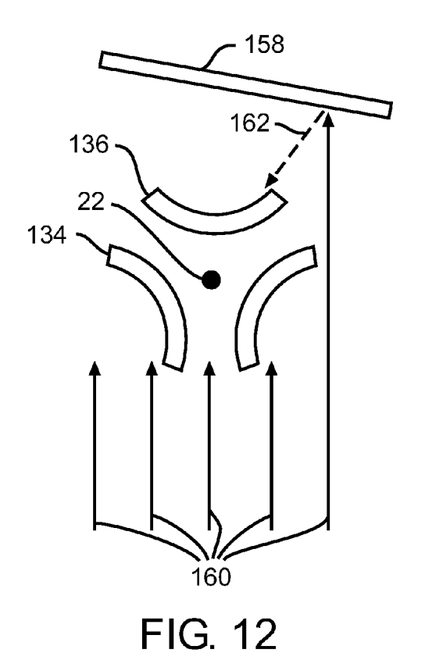
FIG. 12 is a diagram of a cross-sectional view of an exemplary antenna receiving a signal directly and receiving a reflected signal.

Now turning to multipath signals. Multipath signals may decrease the performance of some communication protocols, for example, the 802.11a/b/g protocols. Multipath signals may interfere with reception and may reduce data throughput. Reducing the transmission and reception of reflected signals may improve communication data throughput. A reflective shield may produce reflected signals. Referring to FIG. 9, antenna 22 transmits signals 150 and 154. Signal 150 directly exits opening 144. Signal 154 reflects from shield 136 then exits opening 144 as signal 152. Reflected signal 152 may degrade the performance of a system that receives signals 150 and 152. Absorptive material may be used to reduce the strength of reflected signals. Referring to FIG. 10, antenna 22 transmits signals 150 and 154 as described above. Signal 154 enters absorptive material 148; thereby losing signal strength. Signal 154 reflects from shield 146, passes through the absorptive material again, and exits absorptive material 148 as signal 156. The signal strength of 156, as compared to the signal strength of signal 150, may be less by the amount of signal strength attenuated by passing through the absorptive material twice. The system receiving signals 150 and 156 may better distinguish between the two signals because of their difference in signal strength. Shield placement and/or opening configurations may also reduce the effects of receiving multipath signals. Referring to FIG. 11, shield 164 has two openings. Transmitted signal 160 approaches the shield 164 from a direction of transmission. Part of transmitted signal 160 reaches antenna 22 directly through an opening facing the direction of transmission of signal 160. Part of transmitted signal 160 reflects from object 158 as reflected signal 162. Reflected signal 162 enters through the other opening in the shield; thereby reaching antenna 22 as a multipath signal. A shield with diametrically opposite openings may more readily admit signals reflected in the direction opposite the direction of transmission. A different shield configuration may better block reflected and/or multipath signals. Referring to FIG. 12, transmitted signal 160 enters a shield through an opening facing the direction of transmission and reaches an antenna 22. Reflected signal 162 cannot reach antenna 22 because shield part 136 blocks the reflected signal. A shield whose openings are not diametrically opposed may more readily block signals reflected in the direction opposite the direction of transmission.

Figure 13:
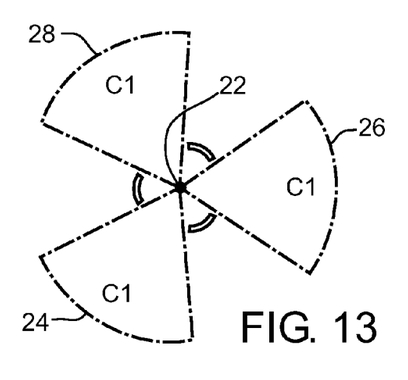
FIG. 13 is a diagram of exemplary coverage pattern produced by an omni-directional antenna inside the exemplary shield of FIG. 2 with an exemplary channel assignment pattern.
Figure 14:
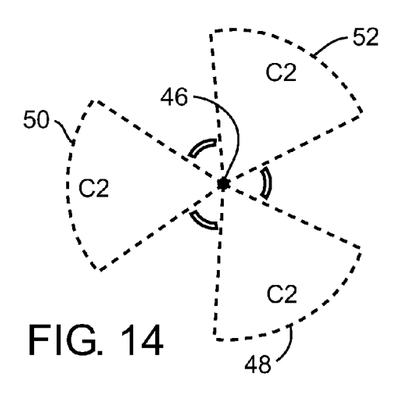
FIG. 14 is a diagram of exemplary coverage pattern produced by an omni-directional antenna inside the exemplary shield of FIG. 2 with an exemplary channel assignment pattern, but with a different orientation than the coverage pattern of FIG. 13.

Now turning to channel assignment. An antenna in a shield may be associated with a radio and may be assigned a channel. The channel used by any coverage lobe is the channel assigned to the antenna that produces the coverage lobe. For example, in one embodiment, referring to FIG. 13, omnidirectional antenna 22 may be assigned channel C1; thus, the channel associated with coverage lobes 24, 26, and 28, produced by antenna 22, may also use channel C1. In another embodiment, referring to FIG. 14, antenna 46 may be assigned channel C2; thus, the channel associated with coverage lobes 48, 50, and 52, produced by antenna 46, may also use channel C2.

Now turning to stacking multiple shields. Shields may be stacked; thereby forming a combined shape of coverage, area of coverage, and channel assignment pattern. The terms shape of coverage, area of coverage, and channel assignment pattern are fully described and established in the applications incorporated by reference. In one embodiment, a shield having a channel assignment and coverage lobes of coverage similar to FIG. 13 may be stacked with a shield having a channel assignment, coverage lobes, and orientation similar to FIG. 14. The resulting area of coverage, shape of coverage, and channel assignment pattern may be represented by the area of coverage, shape of coverage, and channel assignment pattern shown in FIG. 15, which may be similar to the area of coverage, shape of coverage, and channel assignment pattern that may result from superimposing the areas of coverage, shapes of coverage, and channel assignment patterns of FIG. 13 and FIG. 14. When stacking shields, coverage lobes may overlap to form virtual lobes. In the embodiment shown in FIG. 15, virtual lobe 54 may be formed by the overlap of coverage lobes 52 and 26, virtual lobe 56 may be formed by the overlap of coverage lobes 26 and 48, and so forth. In one embodiment, at least two coverage lobes overlap by about 50%. In another embodiment, adjacent coverage lobes overlap by at least about 25%. In another embodiment, at least two coverage lobes overlap by about 100%. There are no limitations on the number of shields and/or associated antennas that may be stacked or the number of coverage lobes that may overlap. In an exemplary embodiment, adjacent and overlapping coverage lobes may use different channels. For example, referring to FIG. 15, coverage lobe 52 uses channel C2 while coverage lobe 26 uses channel C1. The virtual lobe 54 formed by the overlap of coverage lobe 52 and coverage lobe 26 may be serviced using channel C1 or channel C2; thus, any wireless device or client positioned in virtual lobe 54 may be serviced by either channel C1 or channel C2. In another embodiment, adjacent and overlapping coverage lobes may be assigned different and minimally interfering channels.

Figure 16:
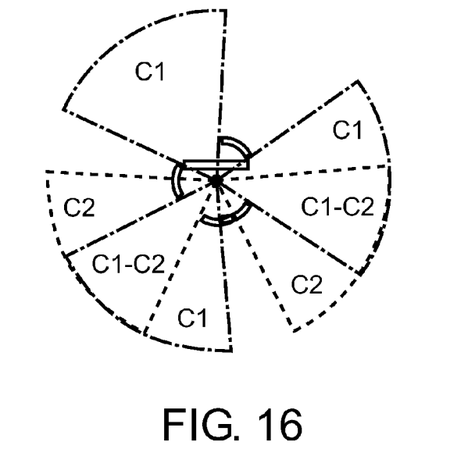
FIG. 16 is a diagram of exemplary coverage and channel assignment pattern that may result when the exemplary coverage patterns of FIG. 6 and FIG. 13 are superimposed.
Figure 17:
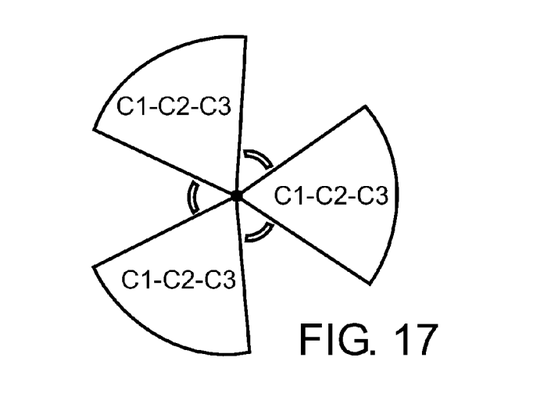
FIG. 17 is a diagram of exemplary coverage and channel assignment pattern that may result when three versions of exemplary coverage pattern of FIG. 13 are superimposed.

There is no limitation on the area of coverage of stacked shields. In one embodiment, a shield providing lobes of coverage similar to the lobes shown in FIG. 3 may be stacked with a shield providing the lobes of coverage similar to the lobes shown in FIG. 6 to provide the coverage shown in FIG. 16. In another embodiment, three shields with their associated antennas and channel assignments overlap to form the coverage shown in FIG. 17.

Figure 15:
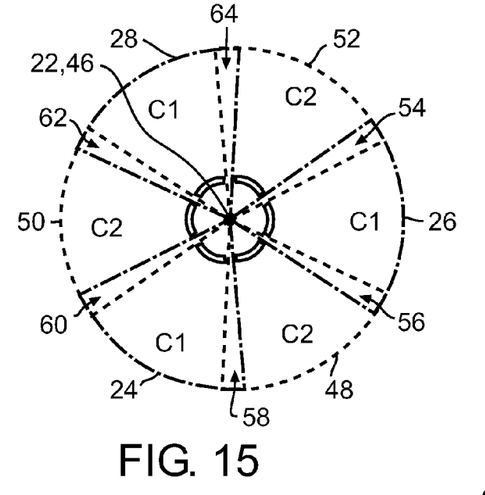
FIG. 15 is a diagram of exemplary coverage and channel assignment pattern that may result when the exemplary coverage patterns of FIG. 13 and FIG. 14 are superimposed.
Figure 18:
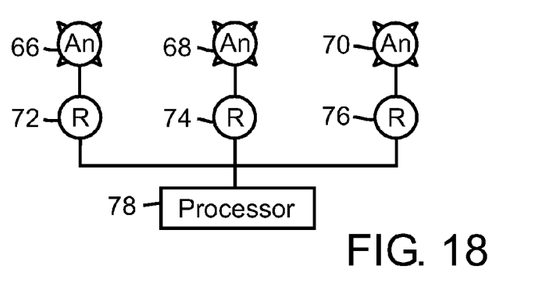
FIG. 18 is a diagram of an exemplary three shielded antenna, three radio wireless cell.
Figure 19:
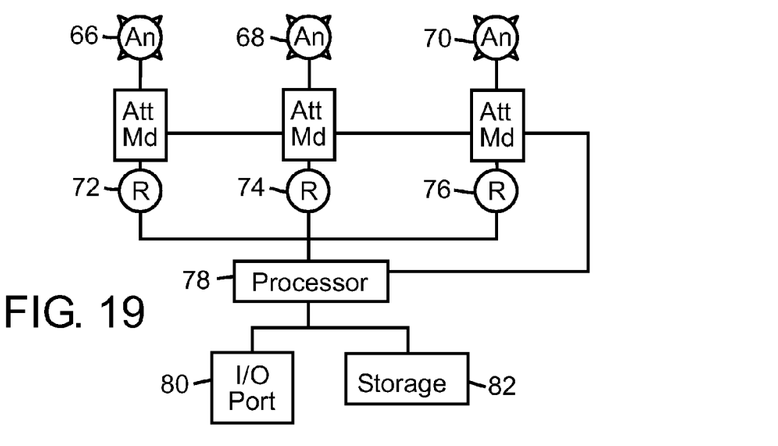
FIG. 19 is a diagram of an exemplary three shielded antenna, three attenuation module, three radio wireless cell.
Figure 20:
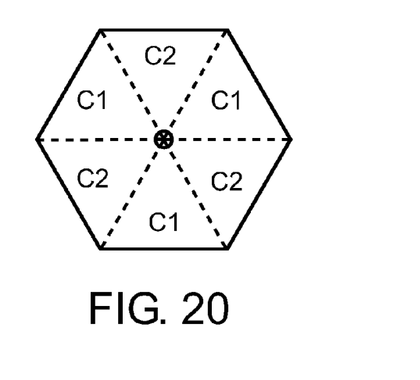
FIG. 20 is a diagram showing an approximate hexagon shape of coverage for the coverage and channel assignment pattern of FIG. 15.

Now turning to wireless cell formation using shields. Shielded antennas may be used to form wireless cells. The term wireless cell is fully described and established in the applications incorporated by reference. In one embodiment, referring to FIG. 18, shielded antennas 66, 68, and 70 interface with radios 72, 74, and 76 respectively, and each radio interfaces with processor 78. The shields may form any shape of coverage. The shields may be stacked to form at least one of overlapping and non-overlapping coverage. Any channel assignment may be used. The channel assignments do not need to be static, but may be changed at any time. A channel change may be triggered by at least one of a fixed time interval, a random time interval, client demand, and routing demand. In one embodiment, the wireless cell circuitry of FIG. 18 may form the coverage pattern shown in FIG. 17. In another embodiment, two shielded antennas, two radios, and one processor may form a wireless cell with coverage shown in FIG. 15. In another embodiment, two shielded antennas, two radios, and one processor may form a wireless cell with coverage shown in FIG. 16. In another embodiment, referring to FIG. 19, an attenuation module may be placed between a radio that may service a shielded antenna; thereby, enabling the size of the coverage lobes to be adjusted. In another embodiment, the size of a coverage lobe may be adjusted by placing absorbing and/or selectively permeable material over an opening. Wireless cells formed using shielded antennas may form wireless networks. The area of coverage of a stack of two shielded antennas as shown in FIG. 15 may be approximated as having a hexagon shape of coverage as shown in FIG. 20. A hexagon shaped wireless cell may be used to implement networks as taught in the applications incorporated by reference. Other channel assignment patterns may be implemented using shielded antenna stacks that may facilitate network formation.

Now turning to exemplary materials for shields. There are no limitations on the types of materials that may be used to construct an embodiment of a shield. An exemplary embodiment may use metal to reflect the RF signal. Such metals may include, for example, copper, aluminum and other materials adapted to reflect radio signals. Other embodiments may use at least one of absorptive and selectively permeable materials. Such materials may include, for example urethane foam, and urethane foam impregnated and/or loaded with carbon.

Figure 21:
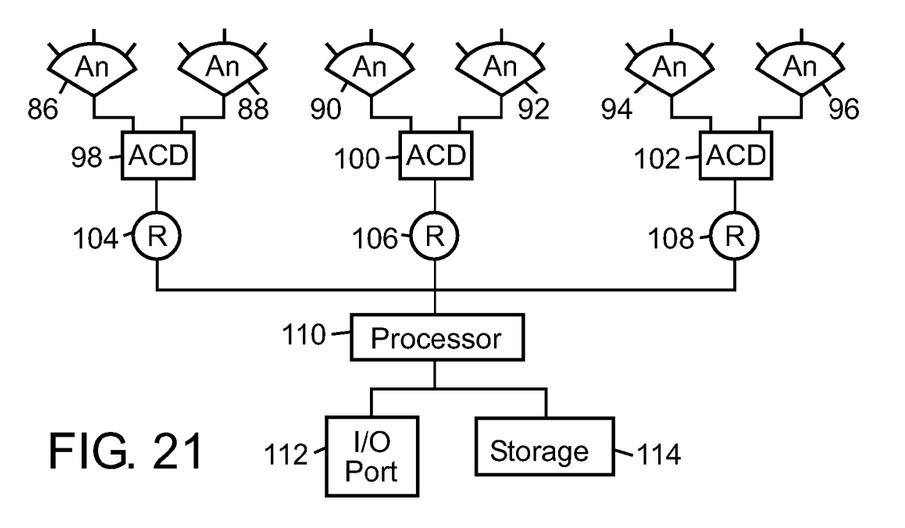
FIG. 21 is a diagram of an exemplary six antenna, three antenna combining device, three radio wireless cell.
Figure 22:
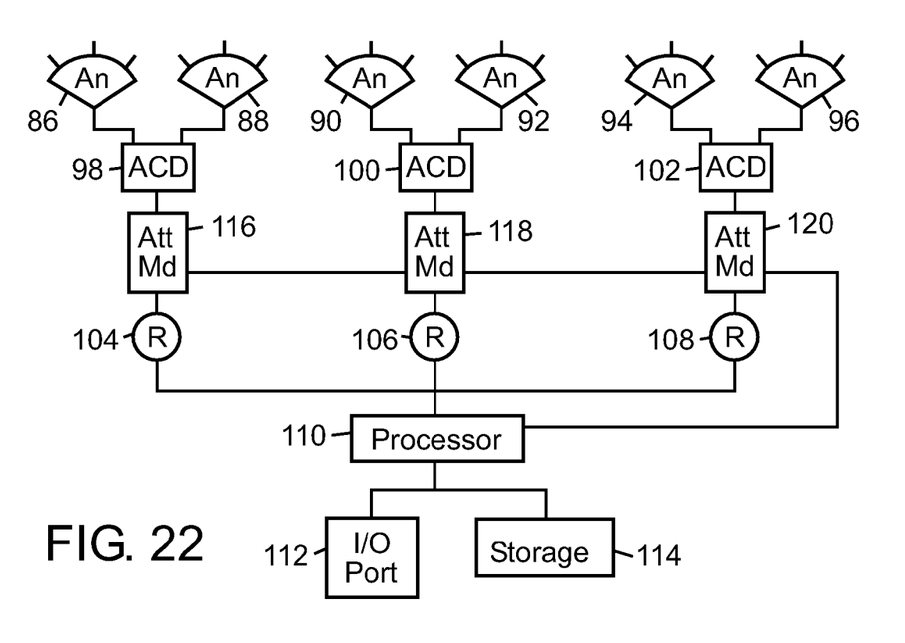
FIG. 22 is a diagram of an exemplary six antenna, three antenna combining device, three attenuation module, three radio wireless cell.
Figures 23, 24, 25:
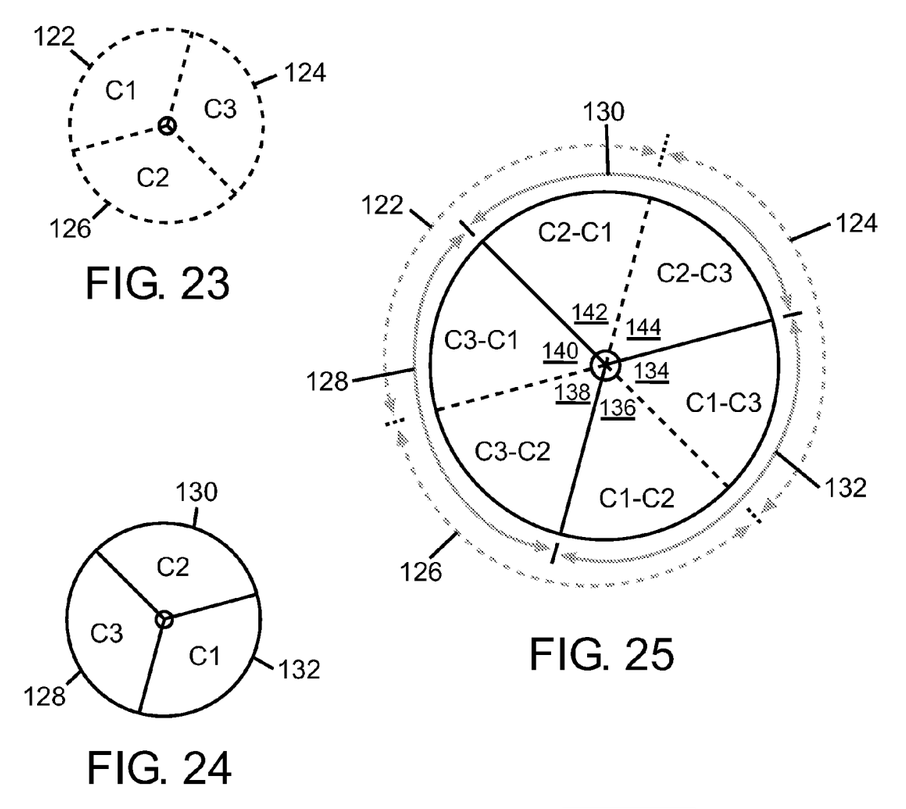
FIG. 23 is a diagram of an exemplary wireless cell formed using three, adjacent, non-overlapping physical sectors providing about 360-degree coverage and having a channel assigned to each physical sector.
FIG. 24 is a diagram of an exemplary wireless cell formed using three, adjacent, non-overlapping physical sectors providing about 360-degree coverage with orientation different than the wireless cell shown in FIG. 17 and having a channel assigned to each physical sector.
FIG. 25 is a diagram of an exemplary wireless cell formed using six overlapping physical sectors that form six virtual sectors and provides about 360-degree coverage that may result when the exemplary coverage patterns of FIG. 23 and FIG. 24 are superimposed.

Now turning to wireless cells formed using antenna combining devices. An antenna combining device (ACD) enables at least two antennas to connect to a radio. The ACD sums all the incoming signals from all the attached antennas and provides the combined signal to the radio. On transmit, the ACD sends the signal from the radio to all attached antennas which in turn transmit the radio signal. An ACD may also be referred to in the art as a hybrid. There is no limitation on the number of antennas that may interface with each ACD. There are no limitations on the type of antenna that may be used, such as, for example, omni-directional, patch, omni-directional with reflector, omni-directional positioned in a horn, yagi, MIMO, array, adaptive array, dish, beam, and parabolic antennas. There are no limitations on the number of radios, the number of ACDs, or the number of processors that may be used to form a wireless cell. In an exemplary embodiment, as shown in FIG. 21, one processor may interface with three radios, each radio may interface with one ACD, and each ACD may interface with at least two directional antennas. The antennas may be arranged to provide at least one of an overlapping and a non-overlapping coverage pattern. The terms overlapping and non-overlapping coverage patterns are fully described and established in the applications incorporated by reference. In one embodiment, antenna 86, 88, 90, 92, 94, and 96 are positioned to correspond to substantially non-overlapping physical sectors 122, 132, 126, 130, 124, and 128 respectively as shown in FIG. 25. For clarity, the physical sectors of FIG. 25 are shown separately in FIG. 23 and FIG. 24. The antennas are positioned to correspond to the substantially non-overlapping positions of FIG. 23 and FIG. 24, the separate non-overlapping areas of coverage may then be superimposed to form the overlapping wireless cell coverage of FIG. 25. The antenna physical sectors 122 through 132 may overlap to form virtual sectors 134 through 144. As described in the applications incorporated by reference, there are no limitations on the area of coverage, shape of coverage, or channel assignment patterns. An ACD may also be used with an attenuation module as shown in FIG. 22. The attenuation modules that may be used with wireless cell embodiments that may have ACDs may be of the variety that have a combined transmit and receive path at the interface between the ACD and the attenuation module. There are no limitations on the number of radios, attenuation devices, ACDs, and antennas in a wireless cell embodiment. In one embodiment, one processor may interface with three radios, at least one attenuation module may interface with each radio, at least one ACD may interface with each attenuation device, and at least two directional antennas may interface with each ACD. The physical sectors of the antennas may be arranged to provide at least one of overlapping and non-overlapping coverage. In one embodiment, the antennas are arranged to provide the coverage pattern of FIG. 25. Other embodiments, with other shapes of coverage, areas of coverage, angles of coverage, and channel assignment patterns as describe in the applications incorporated by reference, may also be implemented using wireless cells that may use ACDs.

Figure 26:
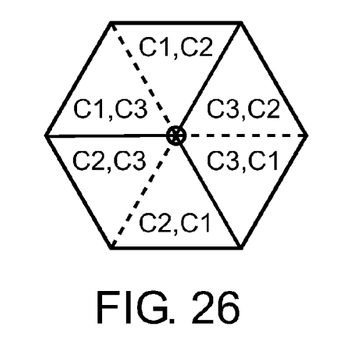
FIG. 26 is a diagram showing an approximate hexagon shape of coverage for the coverage and channel assignment pattern of FIG. 25.

Now turning to network formation using wireless cells formed using ACDs. The shape of coverage of the wireless cells of FIG. 25 may be approximated to be similar to a hexagon as shown in FIG. 26. The channel assignment patterns shown in FIG. 23 through FIG. 26 may be achieved by assigning radio 104, 106, and 108, of FIG. 21 or FIG. 22, to channels C1, C2 and C3 respectively. Wireless networks may be formed using a wireless cell having a shape of coverage similar to a hexagon using the methods described in the applications incorporated by reference. Additionally, wireless cells using ACDs may form other shapes of coverage, areas of coverage, and channel assignment patterns that may also be used to form networks as described in the applications incorporated by reference.

Although the description above contains many details, these should not be construed as limiting the scope of the invention but as merely providing illustrations of some of the exemplary embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

What is claimed is:

1. A method that facilitates wireless communication, the method comprising:
providing at least two shields each one shield having at least one opening and at least two antennas positioned in such a manner that a coverage lobe extends from each antenna through the at least one opening, wherein each antenna is assigned a channel and the coverage lobe of each antenna uses the channel assigned to its associated antenna;
stacking each of the shields; and,
rotating each of the shields, whereby at least one coverage lobe from each shield at least partially overlaps at least one coverage lobe from another shield.

2. The method of claim 1 wherein each antenna of each shield is assigned a different channel.

3. The method of claim 1 wherein each antenna is assigned a different channel.

4. The method of claim 1 wherein stacking comprises positioning at least one shield substantially above at least one other shield.

5. The method of claim 1 wherein the at least two shields comprise two shields, wherein substantially adjacent and partially overlapping coverage lobes are assigned different channels.

6. The method of claim 1 wherein rotating comprises turning a first shield with respect to a second shield.

7. The method of claim 1 wherein rotating positions the at least one coverage lobe of a first shield in a different orientation with respect to the at least one coverage lobe of a second shield.

8. A method that facilitates wireless communication, the method comprising:
stacking at least two shields, wherein each one shield comprises at least one opening and at least two antennas positioned in such a manner that a coverage lobe extends from each antenna through the at least one opening, wherein each antenna is assigned a channel and the coverage lobe of each antenna uses the channel assigned to its associated antenna; and
rotating each of the shields, whereby at least one coverage lobe from each shield at least partially overlaps at least one coverage lobe from another shield.

9. The method of claim 8 wherein each antenna of each shield is assigned a different channel.

10. The method of claim 8 wherein stacking comprises positioning at least one shield substantially above at least one other shield.

11. The method of claim 8 wherein the at least two shields comprise two shields, wherein substantially adjacent and partially overlapping coverage lobes are assigned different channels.

12. The method of claim 8 wherein rotating comprises turning a first shield with respect to a second shield.

13. The method of claim 8 wherein rotating positions the at least one coverage lobe of a first shield in a different orientation with respect to the at least one coverage lobe of a second shield.

14. A method that facilitates wireless communication, the method comprising:

rotating at least two shields, wherein each one shield comprises at least one opening and at least two antennas positioned in such a manner that a coverage lobe extends from each antenna through the at least one opening, wherein each antenna is assigned a channel and the coverage lobe of each antenna uses the channel assigned to its associated antenna, whereby at least one coverage lobe from each shield at least partially overlaps at least one coverage lobe from another shield.

15. The method of claim 14 wherein each antenna of each shield is assigned a different channel.

16. The method of claim 14 wherein stacking comprises positioning at least one shield substantially above at least one other shield.

17. The method of claim 14 wherein the at least two shields comprise two shields, wherein substantially adjacent and partially overlapping coverage lobes are assigned different channels.

18. The method of claim 14 wherein rotating comprises turning a first shield with respect to a second shield.

19. The method of claim 14 wherein rotating positions the at least one coverage lobe of a first shield in a different orientation with respect to the at least one coverage lobe of a second shield.

* * * * *